United States Patent

Harashima

[11] Patent Number: 5,477,453
[45] Date of Patent: Dec. 19, 1995

[54] VIRTUAL ELASTIC COMPONENT SIMULATOR

[75] Inventor: Shokichi Harashima, Saitama, Japan

[73] Assignee: Honda Giken Kogyo Kabushiki Kaisha, Tokyo, Japan

[21] Appl. No.: 102,719

[22] Filed: Aug. 6, 1993

[30] Foreign Application Priority Data

Aug. 6, 1992 [JP] Japan .................................. 4-210446

[51] Int. Cl.$^6$ .............................. G01M 7/00; G05D 19/02
[52] U.S. Cl. ................... 364/424.05; 364/551.01; 364/553; 73/11.04; 73/571; 280/707
[58] Field of Search ................... 364/424.05, 424.03, 364/551.01, 553, 576, 578, 579; 280/707, 840, 6.1; 188/299, 284, 285, 106 R; 73/11.04, 11.08, 658, 660, 662, 146, 571

[56] References Cited

U.S. PATENT DOCUMENTS

| | | | |
|---|---|---|---|
| 3,713,330 | 1/1973 | Lentz | 73/118.1 |
| 3,718,033 | 2/1973 | Petersen | 73/118.1 |
| 3,821,893 | 7/1974 | Klinger et al. | 73/118.1 |
| 4,263,809 | 4/1981 | Petersen et al. | 73/798 |
| 4,265,123 | 5/1981 | Cappel | 73/663 |
| 4,480,480 | 11/1984 | Scott et al. | |
| 4,537,076 | 8/1985 | Lax et al. | 73/662 |
| 4,989,148 | 1/1991 | Gürke et al. | 364/424.05 |
| 5,003,819 | 4/1991 | Koopmann | 73/146 |
| 5,065,618 | 11/1991 | Hodges, Sr. et al. | 73/146 |
| 5,175,698 | 12/1992 | Barbanell | 364/553 |
| 5,251,728 | 10/1993 | Mund et al. | 188/299 |
| 5,272,633 | 12/1993 | Pietsch | 364/424.05 |

FOREIGN PATENT DOCUMENTS

| | | |
|---|---|---|
| 2201590 | 7/1972 | Germany . |
| 56-19706 | 5/1981 | Japan . |
| 61-164134 | 7/1986 | Japan . |
| 61-164135 | 7/1986 | Japan . |
| 61-157847 | 9/1986 | Japan . |
| 62-42350 | 10/1987 | Japan . |
| 5-34245 | 2/1993 | Japan . |
| 534245 | 2/1993 | Japan . |
| 1510492 | 5/1978 | United Kingdom . |
| WO85/03547 | 8/1985 | WIPO . |

*Primary Examiner*—Kevin J. Teska
*Assistant Examiner*—Tan Q. Nguyen
*Attorney, Agent, or Firm*—Birch, Stewart, Kolasch & Birch

[57] ABSTRACT

The present invention provides a which enables a person to experience the effect of change of an actual elastic component of a vehicle for an elastic component of another design without changing the actual elastic component. A vehicle elastic component simulator having a first arithmetic unit, a second arithmetic unit and a third arithmetic unit for calculating a transfer function through test vibration, obtaining the inverse transfer function of the calculated transfer function and determining vibrating signals by multiplying the inverse transfer function by desired signals produced on the basis of the output signals of accelerometer provided during the travel of the vehicle includes a fourth arithmetic unit which calculates the ratio between a transfer function for an elastic component of the vehicle, and a transfer function for a virtual elastic component corresponding to the elastic component, entered by an input device, a fifth arithmetic unit for multiplying vibrating signals in a frequency range by the calculated ratio, and a vibrating system driven by vibrating signals provided by the fifth arithmetic unit to vibrate the vehicle to provide virtual elastic component simulation.

32 Claims, 3 Drawing Sheets

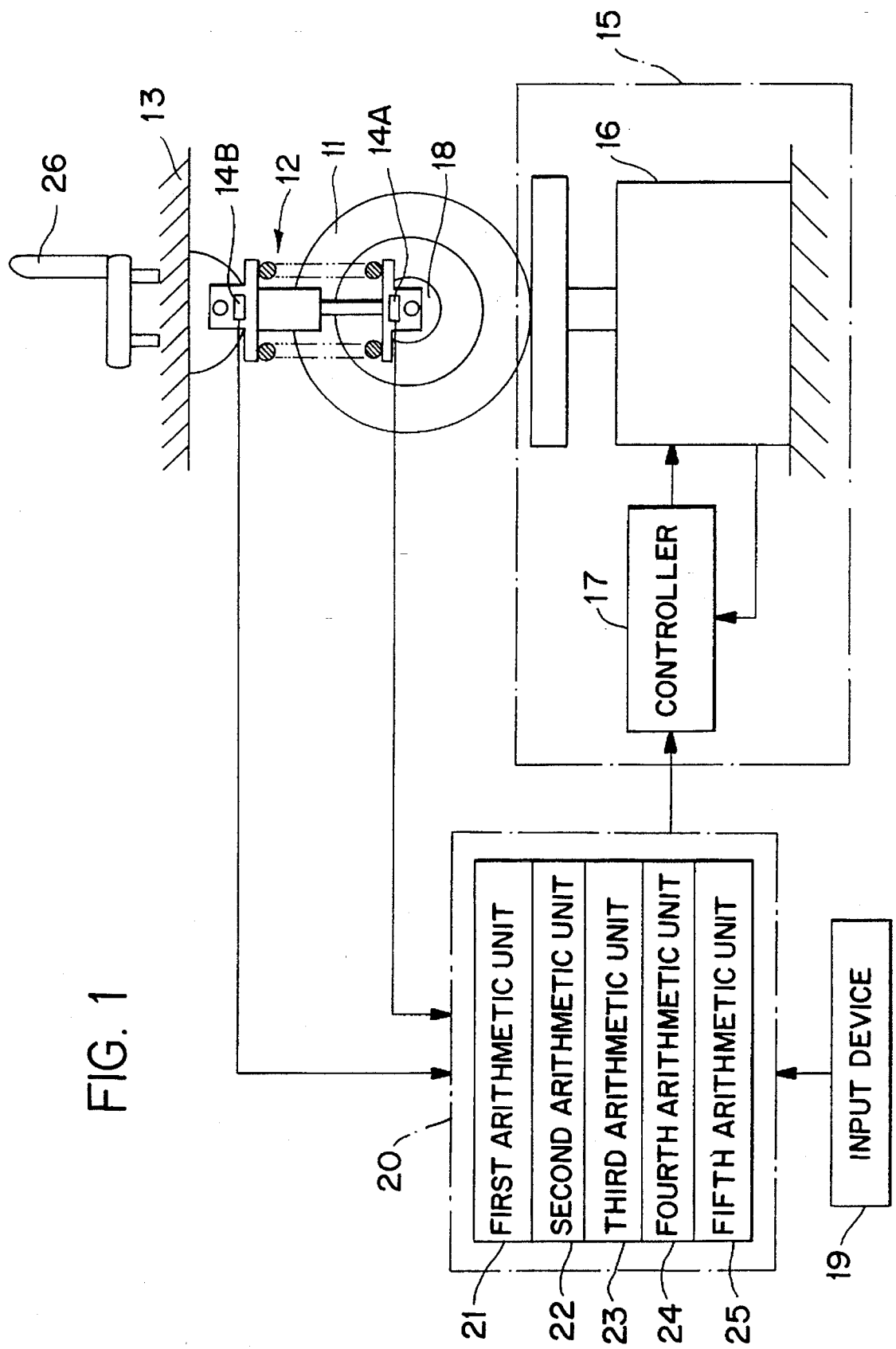

$$\begin{pmatrix} D_1 \\ D_2 \\ D_3 \\ D_4 \end{pmatrix} = \begin{pmatrix} G_{11} & G_{12} & G_{13} & G_{14} \\ G_{21} & G_{22} & G_{23} & G_{24} \\ G_{31} & G_{32} & G_{33} & G_{34} \\ G_{41} & G_{42} & G_{43} & G_{44} \end{pmatrix} \begin{pmatrix} V_1 \\ V_2 \\ V_3 \\ V_4 \end{pmatrix}$$

FIG. 3(a)

$$\begin{pmatrix} V_1 \\ V_2 \\ V_3 \\ V_4 \end{pmatrix} = \begin{pmatrix} G_{11} & G_{12} & G_{13} & G_{14} \\ G_{21} & G_{22} & G_{23} & G_{24} \\ G_{31} & G_{32} & G_{33} & G_{34} \\ G_{41} & G_{42} & G_{43} & G_{44} \end{pmatrix}^{-1} \begin{pmatrix} D_1 \\ D_2 \\ D_3 \\ D_4 \end{pmatrix}$$

FIG. 3(b)

VIRTUAL ELASTIC COMPONENT SIMULATOR

BACKGROUND OF THE INVENTION

1. Field of the Invention

The present invention relates to a Virtual Elastic Component Simulator apparatus for testing a vehicle and, more specifically, to a Virtual Elastic Component Simulator apparatus capable of virtually changing the component elastic member of an elastic system including mechanisms having a vehicle seat for simulating the behavior of the elastic system.

2. Description of Background Art

When conducting road simulation by using a road simulating apparatus, actual traveling data, i.e., the output signals of vibration detectors mounted on a vehicle to reproduce actual traveling load, are collected and desired data is produced on the basis of the actual traveling data. On the other hand, the vehicle is vibrated according to test vibrating signals for testing by a vibration generator, a transfer function is calculated on the basis of the test vibrating signals and the output signals of the vibration detectors, and calculate an inverse transfer function on the basis of the calculated transfer function. The desired data is subjected to Fourier transformation, the inverted transfer function is multiplied by the Fourier-transformed desired data, the multiplied inverse transform function is subjected to inverse Fourier transformation to calculate vibrating signals, and the vibration generator is driven by the calculated vibrating signals for road simulation.

OBJECTS OF THE INVENTION

A person aboard a vehicle experiencing simulated vibration is able to experience a feeling of riding similar to that given by the actual vehicle traveling on the road. When testing the dependence of a riding feeling with respect to vibration characteristics, endurance characteristics and running performance of the vehicle on the elastic system supporting the seat by changing one of the elastic components of the elastic system supporting the seat (such as the suspension system) the suspension system of the vehicle needs to be actually changed.

It is an object of the present invention to provide a Virtual Elastic Component Simulator apparatus capable of enabling a person who is aboard the vehicle to experience the effects resulting from the change of the elastic system of the vehicle without actually changing the elastic system supporting the seat and instead of representing the effects by numerical expressions and graphs.

SUMMARY OF THE INVENTION

To achieve the above object, the present invention provides a road simulating apparatus having an arithmetic means which utilizes a transfer function which is calculated on the basis of the output signals of vibration detectors mounted on a travelling vehicle. During road simulation, the vibration generator is driven by test vibration signals to reproduce actual traveling load. The arithmetic means obtains the inverse transfer function of the operated transfer function, multiplies the inverse transfer function by desired signals produced on the basis of the output signals of the vibration detectors produced during the traveling of the vehicle, and calculates vibration signals on the basis of the multiplied inverse transfer function. An input means is provided for entering the transfer function for a virtual elastic component corresponding to an elastic component of the vehicle. A first arithmetic means is provided for calculating the ratio between a transfer function for the elastic component and the transfer function entered by the input means. A second arithmetic means is provided for multiplying the multiplied inverse transfer function by the calculated ratio to vibrate the vehicle by the vibration generator according to the output vibrating signals of the second arithmetic means.

The elastic component of the elastic system may be the suspension or the seat of the vehicle. The Virtual Elastic Component Simulator apparatus calculates the ratio between the transfer function entered by means of the input means for the virtual elastic component corresponding to an elastic component of the vehicle mounted on a test bench exactly simulating actual traveling load. The transfer function for the elastic component by the first arithmetic means, multiplies the multiplied output of the arithmetic means of the Virtual Elastic Component Simulator apparatus by the ratio calculated by the first arithmetic means, and vibrates the vehicle by the vibrating signals provided by the second arithmetic means.

Accordingly, the vehicle can be vibrated by entering the transfer function for the virtual elastic component by means of the input means in a mode exactly equal to a mode in which the vehicle is vibrated when the elastic component of the vehicle is replaced with the virtual elastic component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a typical view of a road simulating apparatus in a preferred embodiment according to the present invention;

FIGS. 3(a) and 3(b) are matrices of transfer functions showing the relation between vibrating signals and desired signals.

DETAILED DESCRIPTION OF THE PREFERRED EMBODIMENTS

Figure 2A:
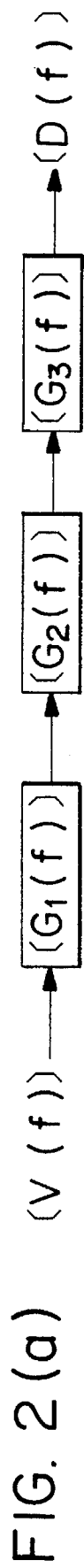
FIGS. 2(a), 2(b) and 2(c) are block diagrams of transfer functions.

A road simulating apparatus in a preferred embodiment according to the present invention will be described hereinafter.

FIG. 1 is a typical view of the road simulating apparatus embodying the present invention, in which one of the wheels of a vehicle, and the associated parts are shown. The Virtual Elastic Component Simulator apparatus will be described as applied to testing the riding feeling when the suspension system of the vehicle is changed to a virtual suspension system.

FIG. 1 illustrates one of the four wheels 11 of a four-wheel automotive vehicle to be subjected to test vibration. A suspension system 12 supporting a body 13 is connected by an axle 18 to the wheel 11. Accelerometers 14A and 14B are disposed near the opposite ends of the piston rod of the suspension system 12. The accelerometer 14A provided on the unsprung side serves as a vibration detector for road simulation, and the accelerometer 14B provided on the sprung side measures a transfer function for the suspension system in cooperation with the accelerometer 14A. The arrangement shown in FIG. 1 is for one axle, and this arrangement applies also to each of a plurality of axles.

A vibrating system 15 for vibrating the vehicle vertically through the wheel 11 comprises a vibration generator 16 and a controller 17 for controlling the vibration generator 16. The vibration generator 16 employs a hydraulic cylinder actuator, such as a reciprocating hydraulic cylinder actuator. The controller 17 controls supply pressures to be applied respectively to pressure chambers of the hydraulic cylinder actuator on the opposite sides of a piston fitted in the cylinder of the hydraulic cylinder actuator according to vibrating signals. A computer 20 receives the output signals of the accelerometers 14A and 14B, and information about a transfer function entered by means of an input device 19, and calculates vibrating signals. The computer 20 provides the calculated vibration signals to the controller 17 to vibrate the vehicle on the basis of the vibration signals.

The computer comprises a first arithmetic unit 21 which calculates the transfer function on the basis of the test vibration signals by which the vibrating system 15 vibrates the vehicle for testing and the output signals of the accelerometer 14A and calculates an inverse transfer function on the basis of the calculated transfer function. A second arithmetic unit 22 subjects desired data produced on the basis of the output signals of the accelerometer 14A during the actual traveling of the vehicle to Fourier transformation. A third arithmetic unit 23 multiplies the inverse transfer function by the Fourier-transformed desired data to calculate Fourier-transformed vibrating signals and subjects the Fourier-transformed vibrating signals to inverse Fourier transformation to calculate vibrating signals. The vibrating signals obtained by the operation of the first, second and third arithmetic units are given to the vibrating system 15 to vibrate the vehicle for Virtual Elastic Component Simulator.

The computer 20 further comprises a fourth arithmetic unit for calculating a transfer function for the suspension system 12 on the basis of the output signals of the accelerometers 14A and 14B, and calculates the ratio between the transfer function and a transfer function for a virtual suspension system (which will be described later) entered by means of the input device 19. A fifth arithmetic unit 25 multiplies the Fourier-transformed vibrating signals calculated by the third arithmetic device 23 by the ratio calculated by the fourth arithmetic unit 24, and subjects the result of multiplication to inverse Fourier transformation.

The vibrating system 15 of the road simulating apparatus receives the test vibrating signals and vibrates the vehicle for test vibrations, the first arithmetic unit 21 calculates the transfer function on the basis of the test vibrating signals and the output signals of the accelerometer 14A and calculates the inverse transfer function on the basis of the calculated transfer function.

The second arithmetic unit 22 subjects the desired data produced on the basis of the output signals of the accelerometer 14A produced during the actual traveling of the vehicle to Fourier transformation. The third arithmetic unit 23 multiplies the calculated inverse transfer function by the Fourier-transformed desired data and subjects the result of multiplication to inverse Fourier transformation to provide the vibration signals.

Suppose that four vibration detectors are used to output desired signals d1, d2, d3 and d4; D1, D2, D3 and D4 are the Fourier-transformed desired signals of the desired signals, d1, d2, d3 and d4; [G(f)] is a transfer function matrix, [G(f)]$^{-1}$ is an inverse transfer function, and V1, V2, V3 and V4 are Fourier-transformed vibrating signals. Then, the relation between the Fourier-transformed desired signals D1, D2, D3 and D4 and the Fourier-transformed vibrating signals V1, V2, V3 and V4 is expressed by matrices shown in FIGS. 3(a) and 3(b). Vibrating signals v1, v2, v3 and v4 are obtained by subjecting the Fourier-transformed vibrating signals V1, V2, V3 and V4 obtained by using the matrices shown in FIGS. 3(a) and 3(b) to inverse Fourier transformation. The vibration generator is driven for road simulation by the vibrating signals v1, v2, v3 and v4.

Accordingly, when calculating the vibration signals [v(t)], the transfer function [G(f)], the inverse transfer function [G(f)]$^{-1}$ and the Fourier-transformed desired signals [D(f)] are stored in a RAM (not shown) included in the computer 20. When the present invention is applied to four axles, the elements of the Fourier-transformed vibrating signals [V(f)] are V1(f), V2(f), V3(f) and V4(f), and the elements of the Fourier-transformed desired signals [D(f)] are D1(f), D2(f), D3(f) and D4(f), in which "[]" represents a matrix.

Suppose that a transfer function for the vibrating system 15 is [$G_1(f)$], a transfer function for the wheel 11 is [$G_2(f)$] and a transfer function for the suspension system 12 is [$G_3(f)$] then, as shown in FIG. 2(a), a transfer function [$G_0(f)$] for a mechanism connecting the vibrated point to the body 13 is expressed by:

$$[G_0(f)] = [G_1(f)] \cdot [G_2(f)] \cdot [G_3(f)] \quad (1)$$

For example, the transfer function [$G_3(f)$] for the suspension system 12 can be determined on the basis of the output signals of the accelerometers 14A and 14B provided when the vehicle provided with the accelerometers 14A and 14B is vibrated in a mode equivalent to a mode of vibration under actual traveling load.

Since the transfer function [$G_3(f)$] and other transfer functions, in general, are nonlinear functions, these transfer functions are substituted by approximate transfer functions obtained by linear approximation in which a portion of the function at each predetermined frequency is regarded as linear portion.

The effect of change of the suspension system 12 for a virtual suspension system on the mode of vibration of the vehicle will be simulated. Suppose that the virtual suspension system has vibration damping performance higher than that of the suspension system 12 and a spring constant smaller than that of the suspension system 12. Then, a transfer function for the virtual suspension can be estimated from the transfer function [$G_3(f)$] for the suspension system 12 and can be developed by using a mathematical model of the virtual suspension system or may be determined through measurement.

The input device 19 gives a transfer function [$G_{3i}(f)$] for the virtual suspension system to the computer 20. Then, the fourth arithmetic unit 24 calculates the ratio $R_3 = [G_{3i}(f)]/[G_3(f)]$ where [$G_3(f)$] is a transform function for the suspension system 12. Then, the fifth arithmetic unit 25 multiplies Fourier-transformed vibrating signal [V(f)] calculated by the third arithmetic unit 23 by the ratio $R_3$ to obtain $R_3 \cdot [V(f)]$, and subjects $R_3 \cdot [V(f)]$ to inverse Fourier transformation to provide vibrating signals represented by [vn(t)]. The vibrating system 15 is driven by the vibrating signals [vn(t)] before replacing the suspension system 12 with the virtual suspension system.

When the suspension system 12 is replaced with the virtual suspension system, the Fourier-transformed vibrating signals [Vn(f)] is expressed by:

$$[Vn(f)] = [V(f)] \cdot [G_{3i}(f)] / [G_3(f)] \quad (2)$$

Figure 2B:
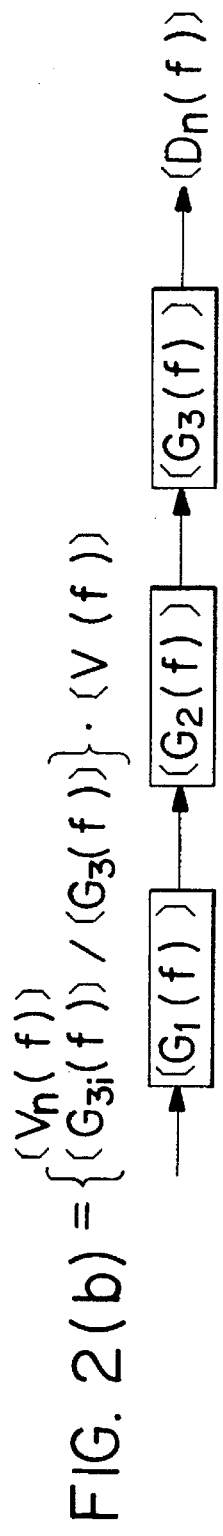

However, since the suspension system 12 has not been actually changed, the transfer function shown in FIG. 2(a) remains unchanged. Therefore, Fourier-transformed desired signals [Dn(f)] shown in FIG. 2(b) are expressed by:

$$\begin{aligned}[Dn(f)] &= \{\{[G_{3i}(f)]/[G_3(f)]\} \times [G_1(f)] \times [G_2(f)] \times \\ &\quad [G_3(f)]\} \times [V(f)] \\ &= \{[G_1(f)] \times [G_2(f)] \times [G_{3i}(f)]\} \times [V(f)]\end{aligned} \quad (3)$$

Figure 2C:
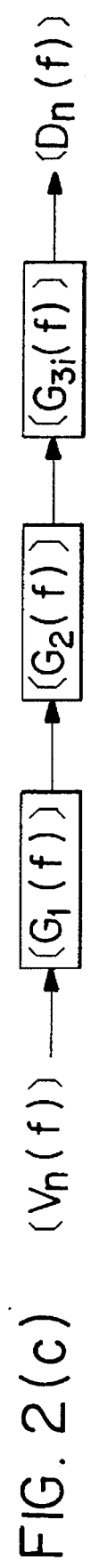

When the suspension system 12 is changed for the virtual suspension system, the transfer function $[G_3(f)]$ of the transfer function $[G(f)]$ expressed by the expression (1) is replaced with the transfer function $[G_{3i}(f)]$. In this state, the vibrating system 15 is driven by the vibrating signals calculated by the third arithmetic unit 23. Then, as shown in FIG. 2(c), the Fourier-transformed desired signals [Dn(f)] is expressed by:

$$[Dn(f)] = \{[G_1(f)] \cdot [G_2(f)] \cdot [G_{3i}(f)]\} \cdot [V(f)] \quad (4)$$

As is obvious from the comparison of the expressions (3) and (4), the expressions (3) and (4) are identical with each other. Consequently, although the vehicle's suspension system is not actually changed, vehicle vibrates in the same mode as that in which the vehicle vibrates with an actually changed suspension system by using the virtual suspension system instead of the suspension system 12 and by employing vibrating system which is driven by the vibrating signals [vn(t)] obtained through the inverse Fourier transformation of the Fourier-transformed vibration signals [Vn(f)] provided by the fifth arithmetic unit. Thus, a person is able to experience a riding feeling which can be experienced on the vehicle provided with the virtual suspension system, though the vehicle's actual suspension system is not physically changed.

The suspension system 12 can be optimized by setting a transfer function $[G_2(f)]$, driving the vibrating system 15 by calculated vibrating signals [vn(t)] and finding a transfer function $[G_{3i}(f)]$ that realizes a most comfortable riding feeling and designing the suspension system 12 so that the transfer function for the suspension system 12 coincides with the transfer function $[G_{3i}(f)]$. Thus, the present invention enables designing a vehicle capable of realizing a most comfortable riding feeling as well as analyzing an actual vehicle for riding feeling.

Although the embodiment has been described as applied to the analysis of the suspension system 12 using the virtual suspension system, the present invention is applicable also to the analysis of the wheel 11 including the tire using a virtual wheel. Although the accelerometers 14A and 14B of the embodiment are disposed on the body 13 near the opposite ends of the piston rods of the suspension system 12, the accelerometers 14A and 14B may be disposed on the upper and lower ends of the seat 26, respectively, for the analysis of the seat, using a virtual seat.

As is apparent from the foregoing description, according to the present invention, the ratio between a transfer function for a virtual elastic component corresponding an actual elastic component entered by means of the input device and a transfer function for the actual elastic component is calculated; vibrating signals in a frequency range are multiplied by the calculated ratio; and the vehicle is vibrated by the vibrating signals determined on the basis of the product of the calculated ratio and the vibrating signals in the frequency range. Accordingly, the vehicle vibrates in the same mode as that in which the vehicle vibrates when the vehicle is provided with the virtual elastic component instead of the actual elastic component. Thus, riding feeling, the vibrational characteristics, endurance characteristics and running characteristics of the vehicle can be tested without actually changing the elastic component of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for virtually changing an elastic component of an elastic system and simulating the effect of this virtual change, comprising:

means for determining the transfer function of an elastic component;

an input means for inputting a transfer function for a virtual elastic component said virtual elastic component representing an elastic component in said elastic system;

first arithmetic means for calculating a ratio between the transfer function of the elastic component and the transfer function of the virtual elastic component;

means for determining a transfer function of a virtual elastic system from said ratio; and means for using said transfer function of a virtual elastic system to simulate the effect of using a virtual component in said elastic system.

2. The apparatus according to claim 1, wherein said elastic system is the suspension system of a vehicle.

3. The apparatus according to claim 2, wherein said suspension system includes a piston rod means and spring means operatively mounted between an axle of a wheel and said elastic component.

4. The apparatus according to claim 1, wherein said elastic component is the seat of the vehicle.

5. The apparatus according to claim 1, wherein said elastic component is a wheel of a vehicle.

6. The apparatus according to claim 1, wherein said elastic component is a suspension member of a vehicle.

7. A system for simulating the replacement of an elastic component in an elastic system which utilizes a transfer function of the elastic system:

(a) an input means for entering a transfer function of a virtual elastic component, said virtual elastic component representing an actual elastic component in said elastic system;

(b) a vibrating means for inducing vibrations in said elastic system;

(c) a vibration detector for detecting vibrations in the elastic system and generating vibration signals;

(d) a first arithmetic unit for calculating the ratio between a transfer function for an elastic component and the transfer function of a virtual elastic component entered by the input means; and (e) a second arithmetic unit for multiplying said vibration signals by said ratio and generating output vibration signals.

8. The apparatus according to claim 7, wherein said vibrating means includes a means for controlling said vibrations which inputs said generated vibration signals and controls said vibrating means to produce vibrations in said elastic system that simulate the replacement of an elastic component with a virtual elastic component.

9. The apparatus according to claim 7, wherein said elastic system is the suspension system of a vehicle.

10. The apparatus according to claim 9, wherein said suspension system includes a piston rod means and spring means operatively mounted between an axle of a wheel subjected to said test vibration and said elastic component.

11. The apparatus according to claim 10, wherein said vibration detectors are operatively mounted adjacent to said axle of a wheel subjected to said test vibration and said elastic component.

12. The apparatus according to claim 7, wherein said elastic component is the seat of the vehicle.

13. The apparatus according to claim 12, wherein said seat of the vehicle includes upper and lower ends and said vibration detectors are operatively mounted adjacent to said upper and lower ends of said seat.

14. The apparatus according to claim 7, wherein said elastic component is a wheel of a vehicle.

15. The apparatus according to claim 7, wherein said elastic component is a suspension member of a vehicle.

16. A vibration signal generator apparatus for generating vibration signals that are used by a vibrating system to vibrate an elastic system having an elastic component, said elastic system and said elastic component having associated transfer functions, said vibration signal generator further comprising:

(a) an input means for entering a transfer function of a virtual elastic component, said virtual elastic component representing an actual elastic component in said elastic system, and for entering a vibration signal representative of vibrations in said elastic system;

(b) a first arithmetic unit for calculating the ratio between a transfer function for an elastic component and the transfer function of a virtual elastic component entered by the input means; and (c) a second arithmetic unit for multiplying said vibration signals by said ratio and generating output vibration signals.

17. The apparatus according to claim 16, wherein said elastic system is the suspension system of a vehicle.

18. The apparatus according to claim 17, wherein said elastic system is a suspension system which includes a piston rod means and spring means operatively mounted between an axle of a wheel and said elastic component.

19. The apparatus according to claim 18, wherein vibration detectors are operatively mounted adjacent to said axle of a wheel subjected to said test vibration and said elastic component.

20. The apparatus according to claim 16, wherein said elastic member is a vehicle seat.

21. The road simulating apparatus according to claim 20, wherein said vehicle seat includes upper and lower ends and vibration detectors which are operatively mounted adjacent to said upper and lower ends of said seat.

22. The apparatus according to claim 16, wherein said elastic member is a wheel of a vehicle.

23. The apparatus according to claim 16, wherein said elastic member is a suspension member of a vehicle.

24. A system for simulating the actual replacement of an elastic component in an elastic system comprising:

(a) an elastic system having at least one elastic component;

(b) an input means for entering a transfer function of a virtual elastic component, said virtual elastic component representing an actual elastic component in said elastic system;

(c) a vibrating system for inducing vibrations in said elastic system;

(d) means for controlling said vibrating system;

(e) a detector for detecting vibrations in the elastic system and generating vibration signals;

(f) a first arithmetic unit for calculating a transfer function of the elastic system and an inverse transfer function of the elastic system;

(g) a second arithmetic unit for Fourier transforming the vibration signals output from the detector to generate transformed vibration signals;

(h) a third arithmetic unit for calculating the ratio between a transfer function for an elastic component and the transfer function of a virtual elastic component entered by the input means;

(i) a fourth arithmetic unit for multiplying said Fourier-transformed vibration signals by said ratio and generating vibration signals by inverse Fourier transforming the multiplied result; and (j) wherein said means for controlling said vibrating system inputs said generated vibration signals and controls said vibrating system to produce vibrations in said elastic system.

25. The system according to claim 24, wherein said elastic system is the suspension system of a vehicle.

26. The system according to claim 25, wherein said suspension system includes a piston rod means and spring means operatively mounted between an axle of a wheel subjected to said test vibration and said elastic component.

27. The system according to claim 26, wherein said vibration detectors are operatively mounted adjacent to said axle of a wheel subjected to said test vibration and said elastic component.

28. The system according to claim 24, wherein said elastic component is the seat of the vehicle.

29. The system according to claim 28, wherein said seat of the vehicle includes upper and lower ends and said vibration detectors are operatively mounted adjacent to said upper and lower ends of said seat.

30. The system according to claim 24, wherein said elastic component is a wheel of a vehicle.

31. The system according to claim 24, wherein said elastic component is a suspension member of a vehicle.

32. A method for virtually changing an elastic member of an elastic system of a vehicle and simulating the effect of this virtual change comprising the following steps:

determining the transfer function of an elastic component;

inputting a transfer function for a virtual elastic component said virtual elastic component representing an elastic component in said elastic system;

calculating a ratio between the transfer function of the elastic component and the transfer function of the virtual elastic component;

determining a transfer function of a virtual elastic system from said ratio; and using said transfer function of a virtual elastic system to simulate the effect of using a virtual component is said elastic system.

* * * * *